United States Patent [19]

Tsuchiya et al.

[11] Patent Number: 4,466,085
[45] Date of Patent: Aug. 14, 1984

[54] TAPE REPRODUCING APPARATUS COMBINED WITH A RADIO SET

[75] Inventors: Yasunobu Tsuchiya; Kyuichiro Tominaga, both of Saitama, Japan

[73] Assignee: Clarion Co., Ltd., Tokyo, Japan

[21] Appl. No.: 314,724

[22] Filed: Oct. 26, 1981

[30] Foreign Application Priority Data

Oct. 27, 1980 [JP] Japan ................... 55-152125[U]

[51] Int. Cl.³ ............................................ G11B 31/00
[52] U.S. Cl. ................................. 369/10; 381/86; 381/123
[58] Field of Search .................. 369/6, 7, 10, 2; 179/1 SW, 1 B, 1 PC, 1 VE, 182 A, 182 R; 381/123, 80, 81, 85, 86

[56] References Cited

U.S. PATENT DOCUMENTS 4,109,115  8/1978  Yamamoto ..................... 369/10
4,149,043  4/1979  Itoh et al. ...................... 369/10

FOREIGN PATENT DOCUMENTS 54-139507  10/1979  Japan ........................... 179/1 SW
2032229     4/1980  United Kingdom ......... 179/1 VE Primary Examiner—Donald E. McElheny, Jr.
Attorney, Agent, or Firm—Russell E. Hattis

[57] ABSTRACT

In a tape reproducing apparatus combined with a radio set having a tape reproducing circuit, a radio reception circuit and a loudspeaker, an apparatus capable of connecting a headphone to one of the tape reproducing circuit and the radio reception circuit when the other circuit is connected to the loudspeaker.

10 Claims, 2 Drawing Figures

TAPE REPRODUCING APPARATUS COMBINED WITH A RADIO SET

BACKGROUND OF THE INVENTION

This invention relates to a tape reproducing apparatus combined with a radio set.

In conventional car stereo tape players combined with a radio set, there is frequently provided a deck priority circuit, so that when listening to a tape through a loudspeaker, the power source of the radio is cut off. Such a system has the drawback that it is impossible to simultaneously listen to the radio with a headphone. Conventional home-use stereos similarly have the same drawback, in that it is impossible to simultaneously listen to the radio with a headphone during tape-playing.

OBJECT OF THE INVENTION

It is therefore an object of the present invention to solve the above problem, more specifically, to provide a tape reproducing apparatus combined with a radio set capable of simultaneously listening to either the tape or the radio with a headphone while listening to the other through a loudspeaker.

SUMMARY OF THE INVENTION

In accordance with the present invention, there is provided a tape reproducing apparatus combined with a radio set which comprises:
- a tape reproducing means;
- a radio reception means;
- a loudspeaker;
- a first switching means for selectively supplying said loudspeaker with outputs from said tape reproducing means or said radio reception means; and
- a second switching means for selectively supplying at least one headphone with outputs from said tape reproducing means or said radio reception means.

DETAILED DESCRIPTION OF THE PREFERRED EMBODIMENTS

Figure 1:
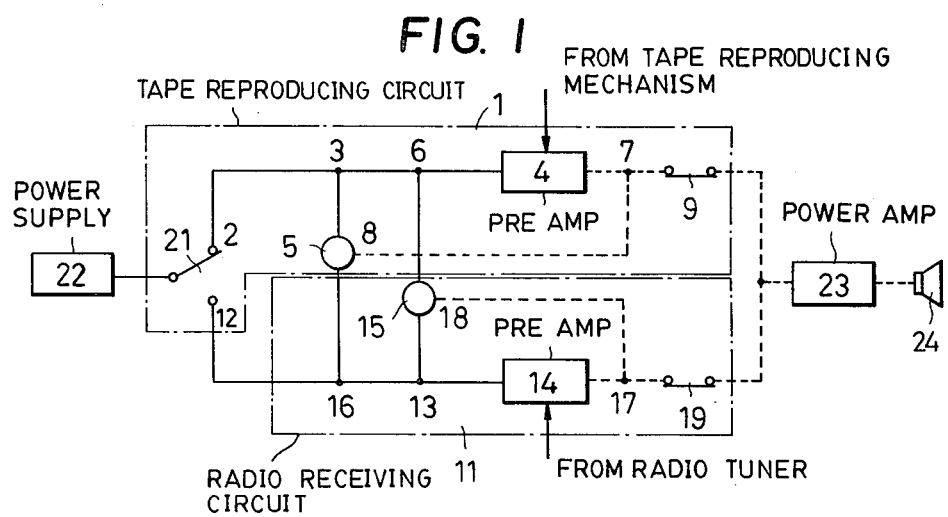
FIG. 1 shows a connection diagram illustrating an embodiment according to the present invention.

The present invention will now be described in detail referring to the preferred embodiments illustrated in the drawings.

FIG. 1 shows an embodiment according to the present invention in which the reference numeral 1 designates a tape reproducing circuit. A pre-amplifier 4 and a headphone jack 5 are connected to a power supply switch terminal 2 through a junction 3. The pre-amplifier 4 is supplied with reproducing signals from a known tape reproducing mechanism not shown. The reference numeral 11 designates a radio receiver circuit in which a pre-amplifier 14 and a headphone jack 15 are connected to power supply switch terminal 12 through a junction 13. The pre-amplifier 14 is to be supplied with signals from a radio tuner not shown.

The headphone jacks 5 and 15 are connected also to the power supply switch terminals 2 and 12, respectively, through junctions 16 and 6. The power supply switch terminals 12 and 2 are alternatively connected to the power source 22 by a switch 21 responsive to insertion of a tape and contacting terminal 2 when a tape cassette (not shown) is inserted and contacting terminal 12 when the tape cassette is out of the unit.

A voice output terminal 7 of the pre-amplifier 4 is connected to a voice input terminal 8 of the headphone jack 5. To the voice output terminal 7, there is also connected one terminal of a main switch 9, said switch being closed when a headphone plug, not shown, is not inserted in the headphone jack 5 and being open when a headphone plug is inserted. The other end of the main switch 9 is connected to a main amplifier 23.

A voice output terminal 17 of the pre-amplifier 14 is connected to a voice input terminal 18 of the headphone jack 15. To the voice output terminal 17 is connected one terminal of a switch 19, said switch being closed when a headphone is not inserted and being open when a headphone plug is inserted. The other end of the switch 19 is connected to the main amplifier 23 to, which a loudspeaker 24 is connected.

With this arrangement, the apparatus operates as follows.

First, when listening to a tape through the loudspeaker 24, the tape is inserted and the headphone jacks 5 and 15 are kept disconnected. Then, the switch 21 is in the position illustrated in FIG. 1 by a solid line thus to allow the pre-amplifier 4 to be supplied with electric power. Accordingly, tape reproduction signals generated from the pre-amplifier 4 are amplified in the main amplifier 23 to be thereafter put out from the loudspeaker 24. At that time, since the pre-amplifier 14 is not supplied with electric power, the apparatus operates the same as a conventional unit of the deck priority circuit tape.

In the above condition, when the headphone is coupled to the headphone jack 5 thus to open the switch 9, outputs from the pre-amplifier 4 are applied to the headphone jack 5. Accordingly, tape reproduction signals are sent to the headphone without reaching the loudspeaker.

Next, for listening to a tape from the loudspeaker 24 and simultaneously to the radio with the headphone, the headphone is coupled with the headphone jack 15, keeping the tape inserted. Thus, the pre-amplifier 4 is supplied with electric power to allow the loudspeaker to receive and put out the tape reproduction signals in the same manner as above, and at the same time, junctions 6 and 13 are shorted by the headphone jack insertion to thereby allow the pre-amplifier 14 to be supplied with electric power and also opening the switch 19, thus causing radio reception signals put out from the pre-amplifier 14 to be sent to the headphone.

Further, for listening to the radio through the loudspeaker 24, any tape is taken out and the headphone jacks 5 and 15 are kept disconnected. Then, the switch 21 is in the position illustrated in FIG. 1 by a dotted line to thereby allow the pre-amplifier 14 to be supplied with electric power, and thus, radio reception signals put out from the pre-amplifier 14 are amplified by the main amplifier 23 to be thereafter put out from the loudspeaker 24. In this case, electric power is not supplied to the pre-amplifier 4.

In this condition, upon coupling the headphone with the headphone jack 15, the switch 19 is opened, and outputs from the pre-amplifier 14 are sent to the headphone jack 15. Thus, the radio reception signals are sent to the headphone without reaching the loudspeaker 24.

For listening to the radio through the loudspeaker 24 and simultaneously to a tape with the headphone, the tape is inserted and the headphone is coupled with the headphone jack 5. Then, although the switch 21 is changed to the position shown in FIG. 1 by the solid line, the junctions 3 and 16 are shorted by the headphone plug insertion to allow the pre-amplifier 14 to be supplied with electric power. Accordingly, radio reception signals are put out from the loudspeaker 24. At the same time, the pre-amplifier 4 is also provided with electric power and the switch 9 is opened, thus resulting in tape reproduction signals from the pre-amplifier 4 being put out from the headphone.

Further, for listening to both the radio and a tape through headphones, the tape is inserted and the headphones are coupled with the headphone jacks 5 and 15, respectively. In this configuration, the switch 21 is in the position shown in FIG. 1 by the solid line and the junctions 3 and 16 as well as 6 and 13 are shorted to allow the pre-amplifiers 4 and 14 to be supplied with electric power. Accordingly, tape reproduction signals and radio reception signals are put out from the headphones, respectively, and on the other hand, the switches 9 and 19 are open, resulting in voice signals being not put out from the loudspeaker 24.

Figure 2:
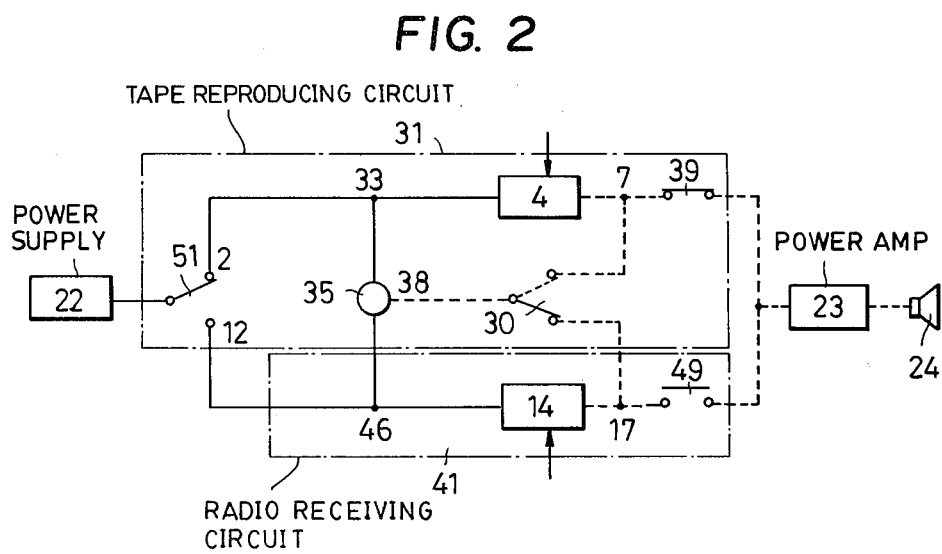
FIG. 2 shows a connection diagram illustrating another embodiment according to the present invention.

FIG. 2 shows another embodiment according to the present invention in which there are provided a headphone jack 35 and a switch 30 instead of two headphone jacks 5 and 15 shown in the embodiment illustrated in FIG. 1.

A switch 51 is not actuated by tape insertion, but is to be manually operated. Switches 39 and 49 interlock with the switch 51 in such a manner that when the switch 51 is in contact with the terminal 2, the switch 39 is closed while the switch 49 is opened, and, when the switch is in contact with the terminal 12, the switch 39 is opened while the switch 49 is closed. The other structure and operation are same as those in the embodiment illustrated in FIG. 1, and so, the same members are designated by the same reference numerals and the detailed description is omitted.

The apparatus in FIG. 2 operates as follows.

First, for listening to a tape through the loudspeaker 24, by inserting a tape, setting the switch 51 at the position shown in FIG. 2 by a solid line, and leaving the headphone jack 35 disconnected, the pre-amplifier 4 is supplied with electric power through the switch 51 to allow the tape reproduction signals from the pre-amplifier 4 to be amplified by the main amplifier 23 and consequently put out from the loudspeaker 24. In this case, since the pre-amplifier 14 is not supplied with electric power, the apparatus operates in the same manner as the conventional deck priority circuit.

Under that condition, when a headphone is coupled with the headphone jack 35 and when the switch 30 is set at the position shown in FIG. 2 by a dotted line, outputs from the pre-amplifier 4 are applied to the headphone jack 35. At that time, since the switch 39 is closed, the tape reproduction signals are put out from both of the loudspeaker 24 and the headphone.

Further under that condition, when the switch 30 is changed to the position shown in FIG. 2 by the solid line, the tape reproduction signals are put out from the loudspeaker 24 as in the above case, and at the same time, since the pre-amplifier 14 is supplied with electric power through the junctions 33 and 46 shorted by the headphone jack, radio reception signals are put out from the headphone.

Next, for listening to the radio through the loudspeaker 24 with no tape inserted, the switch 51 is positioned as shown in FIG. 2 by the dotted line, and the headphone jack 35 is kept free. Thus, the pre-amplifier 14 is supplied with electric power, with the result that the radio reception signals from the pre-amplifier 14 are amplified in the main amplifier 23 and thereafter put out from the loudspeaker 24. At that time, the pre-amplifier 4 is not supplied with electric power.

Under this condition, when the headphone is coupled with the headphone jack 35 and the switch 30 is positioned as shown in FIG. 2 by the solid line, outputs from the pre-amplifier 14 are sent to the headphone jack 35, and at the same time, since the switch 49 is closed, radio reception signals are put out from both the loudspeaker 24 and the headphone.

Further, under this condition, when a tape is inserted and the switch 30 is changed to the position as shown in FIG. 2 by the dotted line, radio reception signals are put out through the loudspeaker 24, and on the other hand, outputs from the pre-amplifier 4, which is supplied with electric power through the junctions 46 and 33 shorted by the headphone jack, are sent to the headphone jack 35, resulting in tape reproduction signals being put out from the headphone.

Incidentally, it should be noted that the present invention can be subject to various modifications and variations.

According to the present invention arranged as above, it is possible to simultaneously listen to either a tape or the radio through a headphone while listening to the other through a loudspeaker. Therefore, when a driver is listening to a tape music through the loudspeaker, another in the car can listen to a short program, for example, of the radio through a headphone, or otherwise, when the driver is listening to a traffic information, etc. of the radio through the loudspeaker, another can listen to a tape music through the headphone. Further, the present invention is not restricted to a car-stereo combined with a radio set but widely adaptable to a home-use stereo or the like combined with a radio set.

We claim:

1. In an automobile radio receiver and tape playing system powered from an electrical power source and having tape reproducing means for supplying electrical tape signals from a tape cassette accepting means, radio signal receiving means for supplying signals from the radio receiver, loudspeaker means coupled to said tape reproducing means and said receiving means, and cassette-insertion responsive first switching means operable by insertion of a cassette into said cassette accepting means from a first switching condition establishing a normal radio mode and supplying only said receiver signals to said loudspeaker means to a second switching condition establishing a tape playing mode and supplying only said tape signals to said loudspeaker means, said first switching means reverting to said first switching condition upon withdrawal of said cassette from said cassette accepting means, the improvement comprising:

first earphone jack means coupled to said tape reproducing means for supplying said tape signals to an earphone plug inserted therein, and second switching means responsive to insertion of an earphone plug into said first jack means for automatically uncoupling said loudspeaker means from said tape reproducing means when said system is in said tape playing mode and for rendering said radio receiving means operative to supply said received signals to said loudspeaker means when said system is in said tape playing mode.

2. The system of claim 1 further comprising second jack means having third switching means associated therewith, said second jack means being coupled to said radio signal receiving means to supply said received signals to an earphone plug inserted therein, said third switching means being actuated responsively to insertion of an earphone plug into said second jack means to uncouple said loudspeaker means from said radio receiving means when said system is in either mode, and for rendering said radio receiving means operative to supply said received signals to said second jack means when said system is in tape mode and no earphone plug is inserted into said first jack means.

3. The system of claim 2 further including means for disconnecting said radio signal receiving means from said power source when said system is placed in said tape playing mode, and wherein said second and third switching means reconnect said radio signal receiving means to said power source responsively to insertion of an earphone plug into either of said first and second jack means.

4. The system of claim 2 wherein actuation of said second and third switching means by insertion of earphone plugs into both said first and second jack means uncouples said loudspeaker means from said radio signal receiving means and said tape reproducing means.

5. In an automobile radio receiver and tape playing system powered from an electrical power source and having tape reproducing means for supplying electrical tape signals from a tape cassette accepting means, radio signal receiving means for supplying signals from the radio receiver, loudspeaker means coupled to said tape reproducing means and said receiving means, and loudspeaker switching means operable from a first switching condition establishing a normal radio mode and supplying only said receiver signals to said loudspeaker means to a second switching condition establishing a tape playing mode and supplying only said tape signals to said loudspeaker means, the improvement comprising:

means for selectively disconnecting said radio signal receiving means from said power source when said system is placed in said tape playing mode; earphone jack means coupled to said tape reproducing means and said radio signal receiving means for selectively supplying said tape signals and said received signals to an earphone plug inserted therein, said jack means having further means associated therewith and actuated responsively to insertion of an earphone plug into said jack means to reconnect said radio signal receiving means to said power source when said system is in said tape mode.

6. The system of claim 5 further including actuating means for actuating said first switching means to said first switching condition responsively to insertion of a cassette into said cassette accepting means and to said second switching condition responsively to the absence of a cassette therein.

7. In an automobile radio receiver and tape playing system powered from an electrical power source and having tape reproducing means for supplying electrical tape signals from a tape cassette accepting means, radio signal receiving means for supplying signals from the radio receiver, loudspeaker means coupled to said tape reproducing mens and said receiving means, and cassette-insertion responsive first switching means operable by insertion of a cassette into said cassette accepting means from a first switching condition establishing a normal radio mode and supplying only said receiver signals to said loudspeaker means to a second switching condition establishing a tape playing mode and supplying only said tape signals to said loudspeaker means, said first switching means reverting to said first switching condition upon withdrawal of said cassette from said cassette accepting means, the improvement comprising: output switching means provided at the respective output stages of said tape reproducing means and of said radio receiving means for coupling them to or decoupling them from said loudspeaker; and at least one headphone jack means for selectively applying the outputs of said tape reproducing means and of said radio receiving means to a headphone plug inserted thereinto, said at least one headphone jack means having associated therewith power switching means actuatable to a power transferring condition responsively to insertion of a headphone plug thereinto for supplying power to the circuitry not selected by said first switch means.

8. The system of claim 7 wherein a first and a second said headphone jack means are provided, each having said power transferring switching means associated therewith, said first headphone jack means being coupled to provide signals form said receiving means to a headphone jack inserted thereinto, said second headphone jack means being coupled to provide signals from said tape reproducing means to a headphone jack inserted thereinto.

9. The system of claim 8 wherein said output switching means decouples said loudspeaker means from said receiving means responsively to insertion of a headphone plug into said first headphone jack means, and decouples said loudspeaker means from said tape reproducing means responsively to insertion of a headphone plug into said second head jack means.

10. The system of claim 7 further including means for operating said output switching means to decouple said loudspeaker means from the output selected by said headphone jack means.

* * * * *